Patented June 20, 1944

2,351,961

UNITED STATES PATENT OFFICE 2,351,961

FROST RESISTANT MICROPOROUS PRODUCT

Gommaris Franciscus Hannôt, Rotterdam, Netherlands; vested in the Alien Property Custodian No Drawing. Application December 9, 1940, Serial No. 369,351. In Germany October 22, 1940

4 Claims. (Cl. 106—87)

Road surfaces, road coatings, stones and materials for filling the joints between pavement stones should especially satisfy the requirements that they have a good resistance against pressure, that their surface is anti-slip and remains so in the rain and that they should not crack or deteriorate in winter during periods of frost.

It has been proposed to use artificial materials consisting of set mixtures of hydraulic cement and a mineral aggregate, such as sand, slag or ashes and water. Especially the addition of a suitable amount of fuel slag can lead to good anti-slip properties of the material. Such material is micro-porous and can absorb a lot of water. Here, however, lies the cause of difficulties in winter. The porous material, which has absorbed water cracks and breaks down into pieces during periods of frost.

The object of my invention is to provide an artificial material or product which, while being micro-porous also has a good resistance against frost.

One of the main features of my invention is the use of a quantity of an organic gelatinizing substance, i. e. a substance adapted to form a gel, selected from a class consisting of gelatine, pectin, agar and an aqueous decoction of orange skins is added to the mixture from which the material is manufactured.

Comparative freezing tests have shown that the product according to the invention is superior to other materials as far as frost resistance is concerned.

This may be explained by the fact that organic gels such as gelatine, agar and pectin have a freezing point, which is considerably lower than that of water. They can absorb and colloidally bind a lot of water and during freezing their volume decreases in contrast to the well known increase of volume of ordinary water which causes the cracking of materials during frost.

Moreover such gels are very elastic and can be easily deformed.

In an embodiment according to my invention I use a decoction of orange skins.

Orange skins contain a good quantity of pectin.

Two practical examples of carrying out my invention will now be described.

Example I

Two litres of coarse sand (grain size 2–0.4 mm.), one litre of very fine sand, one litre of slag (grain size 0–2 mm.), 1200 grams of cement i. e. 0.8 litre of hydraulic cement having a specific weight of 1.5, are mixed with about 1.5 litre of water. The amount of water varies according to the temperature in the atmosphere; if it is warm some more water is necessary. To this mixture 40–50 grams of a special liquid is added. This liquid is obtained by first boiling a shredded orange in one litre of water for so long a time that the skin parts sink, and then filter the obtained decoction after a fortnight's period of standing. It appears that the best results are obtained when only the skin of the orange is boiled.

Artificial stones made from this mixture, after setting of the mixture, were subjected to a heavy freezing test as follows:

| | Hours |
|---|---|
| Submersion in water of 17–20° C | 8 |
| Freezing at minus 8 to minus 10° C | 16 |
| Thawing in air of 16° C | 8 |
| Drying at 65° C | 15 |
| Cooling | 1 |

The operations were repeated twenty times. The same test was made with stones formed from the mixture as described but from which the decoction was omitted. The latter stones cracked and broke down into pieces, those according to my invention remained fully intact and their weight did not alter.

Example II

Gelatine is boiled with water in the ratio of 25 grams of gelatine to two litres of water. The obtained product is filtered. 2.5 to 3.5 volume parts of this product are added to 150 volume parts of water. The resulting amount of liquid is mixed with 200 volume parts of sand having a grain size of 2 to 0.4 millimeter, 100 volume parts of fine sand having a grain size of 0.04 millimetre and 80 volume parts of cement.

The mix is shaped to the required form e. g. cast and vibrated in moulds. After a curing (setting) period of about 28 days the product according to the invention is finished.

Having now particularly described and ascertained the nature of my said invention and in what manner it is to be performed,

I claim:

1. A method of preparing a decoction adapted to render settable mixtures of hydraulic cement and a mineral aggregate frost resistant, while maintaining an anti-slip porous structure of the set mixture comprising the steps of boiling orange skins in water until the extracted skin parts sink and filtering the decoction thus obtained.

2. A method of producing a frost resistant, anti-slip, porous artificial stone comprising the steps of preparing a decoction of orange skins by boiling one shredded orange skin to one litre of water until the skin parts sink and filtering the decoction, then mixing together about 200 parts by volume of sand having a grain size of 2–0.4 millimetre, 100 parts by volume of fine sand having a grain size of 0–0.4 millimetre, 80 parts by volume of cement, 150 parts by volume of water and 5 parts by volume of said filtered decoction, in order to produce a mortar shaping the mortar and permitting it to set.

3. The method of rendering frost resistant and anti-slip a porous artificial stone material made from a mortar comprising a porous aggregate, hydraulic cement, and water, sufficient aggregate being present to make the set product porous, which comprises incorporating in said mortar a small amount of a decoction prepared by extracting orange skins with water at elevated temperatures.

4. A frost-resistant, anti-slip road surfacing material comprising a set mixture of hydraulic cement, porous slag, sand and a small amount of an aqueous decoction of orange skins in amount sufficient, when said material is exposed to water, to form an aqueous gel in the pores of said slag whose volume decreases upon freezing, sufficient slag being present to render the material porous and anti-slip.

GOMMARIS FRANCISCUS HANNÔT.